April 24, 1962
N. C. WILLIAMS
3,031,050
METHOD AND MEANS FOR GEAR SHIFTING
Filed June 18, 1956
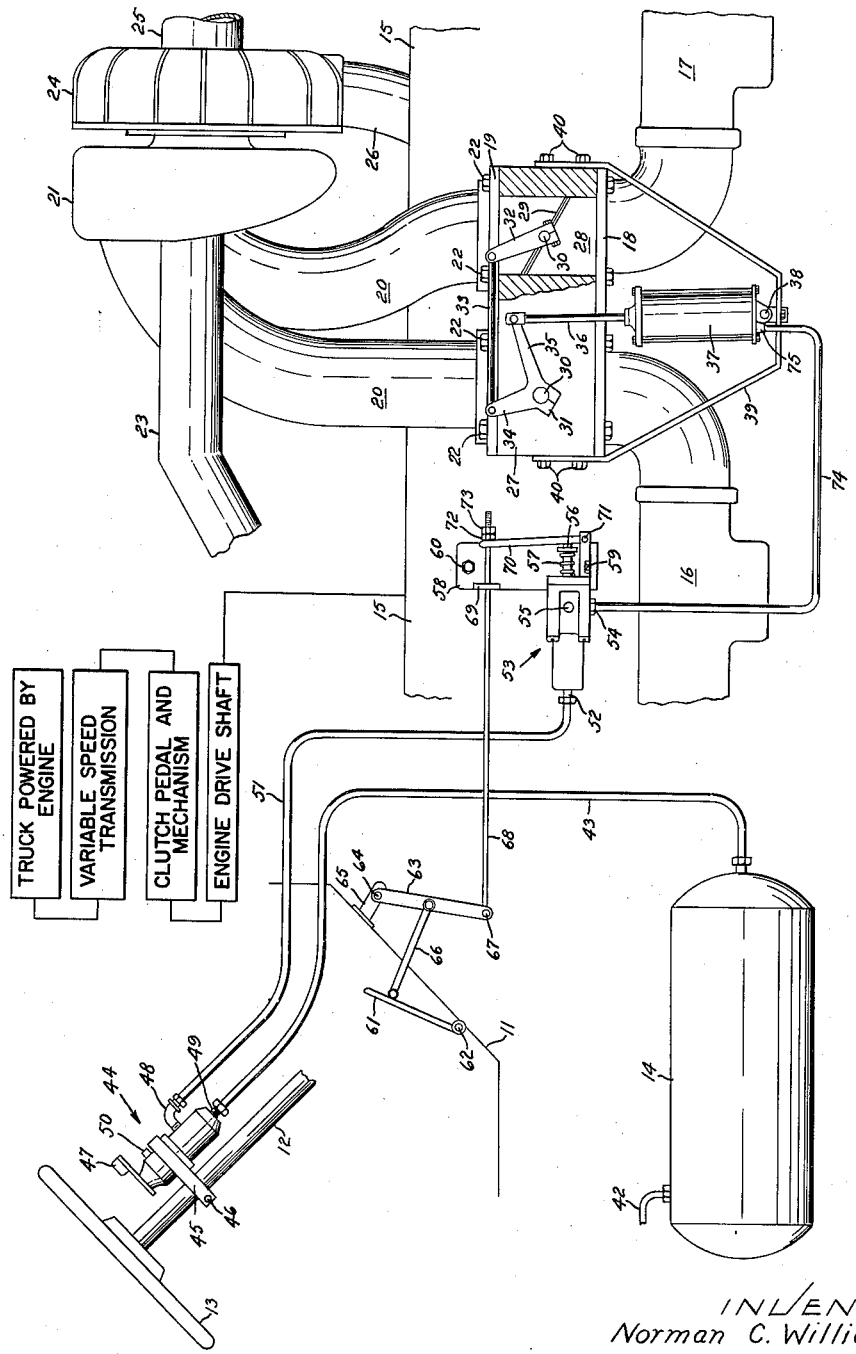
INVENTOR
Norman C. Williams
BY
AGENT

United States Patent Office 3,031,050
Patented Apr. 24, 1962

3,031,050
METHOD AND MEANS FOR GEAR SHIFTING
Norman C. Williams, Portland, Oreg., assignor to Power Brake Equipment Company, a corporation of Oregon
Filed June 18, 1956, Ser. No. 591,895
9 Claims. (Cl. 192—3)

This invention relates generally to internal combustion engine powered over the road vehicles such as large diesel engine powered trucks and buses and more particularly to a method of speed control thereof and the means for practicing the method.

Heavy vehicles of this type used in hilly country usually have transmission gear mechanisms of many steps through which the driver must shift to get up to speed after starting on an upwardly inclined road. It is a principal object of this invention to provide a method of and means for facilitating the road speed increasing shifting of the transmission gears by the operator of the vehicle.

Commonly the engine of the vehicle is connected to the drive shaft of the vehicle through a pedal controlled clutch and a manually controlled transmission gear box having several interchangeable gear trains used to change the ratio of engine speed to drive shaft speed in accordance with either the torque or speed requirements of the drive shaft at the time.

When starting the vehicle on an upgrade and getting up to his running speed for the particular road conditions the operator must start with the transmission shifted to a low speed gear train or one having a high ratio of engine speed to drive shaft speed in order to have a high ratio of drive shaft torque to engine torque in order to have sufficient torque to accelerate the vehicle as required. When the vehicle has accelerated to a speed giving the engine its proper running speed the operator shifts his transmission to the next lower ratio gear train and again accelerates the engine to speed up the vehicle until the engine attains its proper running speed. This operation is repeated step by step through the transmission until the gear train best suited to the highway and the desired speed of the vehicle is arrived at.

While this acceleration of the vehicle and changing of gear trains would seem to be a simple matter, and usually is on a level road, on an upgrade it is not so simple. Remembering that the engine is connected to one half of the clutch, the other half of the clutch is connected to one end of the gear train and the other end of the gear train is connected to the drive shaft, it is seen that to change the gear make up of the train the operator must open his clutch to disconnect the engine from the gear train and then shift his gear lever to open his gear train. His gear shift lever is now in neutral position with the rear end of the transmission being driven by the drive shaft at drive shaft speed and the front end of the transmission including half the clutch continuing to run at approximately its former speed due to the inertia of the parts. Similarly even though the fuel is cut off from the engine the engine is a heavy, high inertia mechanism and takes time to slow down.

The operator must wait for the back half of the clutch and the front half of the transmission to slow down for the gears which will make up the new gear train to be at approximately the speed for him to shift his gear lever to the desired lower ratio and mesh the gears without damage. Due to the high inertia of the parts it takes an appreciable length of time for the gears and clutch to slow down and it does some good to let in the clutch and connect the engine for even though due to its inertia the engine also takes an appreciable length of time to slow down it usually will slow down a little faster than the clutch and gear. In this respect it should be remembered that when idling a gasoline engine, or one with a carburetor, has mechanical losses and in addition power loss due to the necessity of pulling inlet air for combustion through a closed carburetor while a diesel type engine has only mechanical efficiency losses. Thus the engine with which we here are concerned slows down slowly when declutched from its load. On an upgrade the vehicle also will slow down so if the shift of gears is to be made successfully it must be done rapidly. Usually under these conditions an experienced operator is so familiar with his rig that through sound, vibration and his feeling of deceleration he visualizes exactly what is going on in the mechanism and will double clutch to aid him make a fast gear shift and again get the rig accelerating under engine power. By "double clutching" is meant that the operator throws out his clutch and shifts his gear lever to neutral, then quickly lets his clutch back in to connect the engine to the front end of the transmission to use the engine for what help it will give in decelerating the front end of the transmission, then quickly throws out the clutch again, shifts the gear lever to the new gear ratio wanted and finally lets his clutch in again to connect the engine through the clutch and the newly selected gear train to the drive shaft.

Even though the operator "double clutches" and shifts gears as rapidly as possible, the delay of waiting for the front end of the gear train to slow down so the gears can be shifted interferes greatly with the process of getting the rig up to speed. This often makes it impossible to get the rig up to a desired speed because the rig or vehicle slows down when the engine is disconnected from the drive shaft by either the clutch or the gear shift lever and often the vehicle slow down is sufficient to make it inadvisable to make the desired shift.

In studying the above noted upgrade gear shifting difficulty I have discovered that satisfactory shifting where shifting is at all advisable can be done by double clutching and by the use of an engine brake which can be set to be applied automatically to slow up the engine at the proper time during double clutching. While such an engine brake could be of any type actuated by electric, hydraulic, pneumatic, mechanical or other means, the Exhaust Brake System of my pending patent application S.N. 457,074, filed Sept. 20, 1954, and now abandoned, of which this application is a continuation in part, is peculiarly adapted to the present purpose.

The present invention includes the conception of the need for a brake to be automatically applied to the motor of a heavy vehicle at the proper time while "double clutching" to shift gears on an upgrade, the conception that the brake may be of any type actuated by electric, hydraulic, pneumatic, mechanical or other means, the specific conception of the use of an exhaust brake system for the purpose and the invention of the specific exhaust brake system here disclosed for the purpose as applied to a supercharged diesel engine of a bus or truck type of over the road vehicle.

The single FIGURE of the drawing shows somewhat schematically a preferred form of the means of this invention by which the method of this invention may be practiced in connection with a vehicle driven by a supercharged diesel engine.

Referring now to the drawing the vehicle itself being no part of the invention is not shown except that line 11 indicates part of the floor of the operator's cab enclosure, 12 indicates part of the steering column, 13 the steering wheel, 14 a compressed air supply tank and 15 a part of the diesel engine driving the vehicle. It is of course assumed that except as shown the vehicle, its parts and equipment are assembled in ways well known to perform their usual functions.

As is common with large diesel engines for this service, the engine exhaust manifold is split into two sections 16 and 17 each collecting half the exhaust gases of the engine and finished with a common flange plate 18 to which flange plate 19 of the bifurcated inlet casting 20 of exhaust gas driven turbine 21 would normally be bolted by short bolts positioned where long bolts 22 are here shown. The spent exhaust gases after expanding through turbine 21 are discharged to the atmosphere through a muffler, not shown, into which turbine outlet conduit 23 discharges. Driven by turbine 21 is combustion air turbine fan 24 taking in air from the atmosphere through an air cleaner, not shown, and fan inlet 25, then delivering the air at so-called "super-charged" pressure through fan outlet 26 to the air inlet manifold, not shown, of engine 15.

In the practice of this invention flange plate 19 of inlet casting 20 is separated from flange plate 18 of exhaust manifold sections 16 and 17 as shown and compression brake housing 27 is inserted therebetween where it is securely sealed in place by through bolts 22. Compression brake housing 27 is formed with two exhaust gas passageways 28 therethrough connecting turbine inlet passageways 20 respectively with engine exhaust manifold parts 16 and 17. Transversely in each of passageways 28 compression brake dampers 29 are secured to damper shafts 30 rotatably journalled diametrically in the walls of passageways 28. Secured as shown to the ends of shafts 30 which extend outwardly through the walls of housing 27 are bell crank 31 and lever 32 respectively with the outer end of lever 32 linked by rod 33 to leg 34 of bell crank 31. Pivotally connected to the outer end of leg 35 of bell crank 31 as shown is rod 36 of the piston, not shown of pneumatic cylinder 37 pivoted at 38, as shown, to bracket 39 secured to housing 22 by screws 40. Within cylinder 37 rod 36 is heavily spring biased downwardly to the open position of dampers 29. Compressed air storage tank 14 is understood to be kept supplied through inlet 42 with air at a desired pressure by an automatically controlled air compressor carried on the vehicle. Air conduit 43 connects tank 14 with the operator's manual control valve 44 secured to steering column 12 by strap 45 and bolt 46. Within the body of control valve 44 are an air inlet valve and an air exhaust valve overlappingly operable by lever 47. The air inlet valve connects air outlet 48 to air inlet 49 to which conduit 43 is connected and the exhaust valve connects air outlet 48 to atmospheric opening 50. It is understood that control valve 44 may be of the full-on, full-off, type or may be of the compensating or pressure modulating type either of which are well known in the art.

Air line 51 connects outlet 48 of control 44 with inlet opening 52 of control valve 53 having outlet opening 54 and exhaust opening 55. Within the body of control 53 are an inlet valve and an exhaust valve overlappingly operated by stem 56 biased by spring 57 toward the closed position of the inlet valve and the open position of the exhaust valve. The inlet valve connects outlet 54 with inlet opening 52. The exhaust valve connects outlet opening 54 with atmospheric opening 55. Control valve 53 is shown as secured to bracket 58 by screw 59, bracket 58 being secured to the vehicle by screw 60.

Accelerator pedal 61 hingedly secured to the vehicle body at 62 is spring biased, not shown, toward counterclockwise movement about 62 and has the primary function of controlling the fuel injection valves, not shown, of the engine. At its stopped position shown the engine is fed only enough fuel to lubricate the fuel control parts but as the pedal 61 is rotated clockwise about 62 by the operator's foot more and more fuel is fed to the engine.

Lever 63 pivoted at 64 to bracket 65 secured to the underside of floor board 11 is linked by link 66 as shown to pedal 61 and at 67 is pivoted on rod 68 piloted loosely in a hole through ear 69 of bracket 58 and extending through a hole in the upper end of lever 70 pivoted at 71 to control valve 53. Threaded on the end of rod 68 as shown are nut 72 and lock nut 73 as shown. Nuts 72 and 73 are positioned on rod 68 so that when pedal 61 is in its least fuel position or in its stopped position of bias in the counterclockwise direction, lever 70 will press against the end of stem 56 of valve 53 overcoming the bias of spring 56 and holding stem 56 to the open position of the inlet valve and the closed position of the exhaust valve. In other words the adjustment of nuts 72, 73 on rod 68 is such that when the vehicle operator takes his foot from foot throttle pedal 61, inlet opening 52 of control valve 53 is connected with outlet opening 54 but as soon as the operator begins to depress pedal 61, biasing spring 57 moves stem 56 of control valve 53 to close off inlet opening 52 from outlet opening 54 and connect atmospheric opening 55 to outlet opening 54 connected through conduit 74 to opening 75 of pneumatic cylinder 37 to reduce the pressure in cylinder 37 and allow piston rod 36 under its downward bias to rotate bell crank 31 and lever 32 clockwise to move dampers 29 to their positions of full opening of passageways 28 in compression brake housing 27.

The general use of and several specific equipments for, exhaust or compression braking of internal combustion engine powered vehicles are explained in my above noted co-pending application S.N. 457,074. However in the present case equipment is shown as devised particularly for use of the compression or exhaust brake on the very large vehicles powered by the supercharged diesel engine and for use of the compression brake in increasing the rapidity of gear shifting to make it possible to get the heavy rig up to its best running speed on an upgrade.

It has been that by the provision of the simple compression brake body 27 equipped as shown with the air cylinder 37 and the two control valves 44 and 53 with the simple linkage and air lines shown the equipment for our purpose is provided.

The method of operation of the combustion brake equipment means shown for the purpose as above described is as follows.

Assuming that the operator has started up his vehicle in low gear, lever 47 of manually operated valve 44 is in the no compression brake position in which outlet 48 is blocked from inlet conduit 43 and opened to atmosphere at 50. Line 51 is open to atmospheric pressure. Accelerator pedal is depressed because the engine is pulling the vehicle and the pedal controls the fuel feed to the engine. The depression of pedal 61 has allowed spring 57 at control valve 53 to move stem 56 to block inlet 52 from outlet 54 and to connect outlet 54 to atmosphere at 55. Piston rod 36 under its spring bias has opened exhaust dampers 29 in block 27.

The operator feeds more fuel to his engine to get to his top speed in low gear in preparation for shifting to the next higher gear and throws lever 47 to connect valve 53 through valve 44 and lines 51 and 43 with air under pressure from tank 14. However throwing lever 47 has no effect on the cylinder 37 for while fuel is being fed to the engine valve 53 blocks air under pressure from cylinder 37.

When the engine tachometer shows the engine up to its desired speed the operator quickly throws out his clutch, shifts his gear lever to neutral and takes his foot off the accelerator pedal which immediately moves rod 68 to allow spring 57 to shift stem 56 of control valve 53 to connect cylinder 37 through line 74 and control valve 53 to air under pressure in line 51. The air pressure in cylinder 37 immediately overcomes the downward bias on piston rod 36 which moves upward to move dampers 29 to their closed positions of the exhaust conduits, as shown.

Due to the blocking of the exhaust conduits or compression braking the engine slows down rapidly and the operator lets in his clutch to slow down the front end of his gear train. At the proper instant he quickly again throws out his clutch, shifts his gears, steps on the accelerator pedal, lets in his clutch, and further depresses his accelerator pedal to accelerate his load for the next step of his upward gear shift which he accomplishes with an exact repeat of the previously described action.

It should be noted that in shifting through his complete range of gears he does not have to think about his compression brake equipment for exactly on time and whenever needed the compression brake is brought into and out of play as the accelerator pedal is released or depressed.

After the operator has gotten up to the desired road speed of his vehicle he can shift lever 47 of valve 44 to take the compression brake out of automatic use or if the road conditions are such that he wants braking help whenever he takes his foot off the throtttle he can continue to run with lever 47 in the position of connection of air lines 43 and 51.

Having explained the purpose of the method and means of my invention, illustrated and described a preferred form of means and the method of practicing my invention therewith I claim:

1. A control system for an engine adapted to drive an automotive vehicle through a variable ratio gear box connected at one end to said vehicle and a clutch connected between said engine and said gear box, said control system including means for rapidly decelerating said engine when said engine and part of the transmission gear train of a vehicle, said engine is propelling up a grade is disconnected from the drive shaft of said vehicle preliminary to declutching said engine from said gear train to shift said gear train to a lower ratio of input to output speed, said engine including a power control lever having a least power supply position and said system including means operable by said lever for automatically applying said decelerating means to said engine when said lever is moved to its least power supply position and releasing said decelerating means when said lever is moved away from said least power supply position.

2. The system of claim 1 in which said internal combustion engine is a diesel cycle engine.

3. The system of claim 1 in which said internal combustion engine is a supercharged diesel cycle engine.

4. The system of claim 1 in which said internal combustion engine is a diesel cycle engine supercharged by a turbine type fan driven by an exhaust gas driven turbine.

5. The system of claim 1 in which said decelerating means is a compression brake comprising damper means operable to prevent the discharge of exhaust gases from the exhaust manifold of said engine to atmosphere in a desired degree.

6. The system of claim 4 in which said decelerating means comprises a section of exhaust line conduit interposed between the exhaust manifold of the engine and the inlet fitting of the gas driven turbine together with a variable shut-off damper in said interposed section of conduit and said means for applying said decelerating means includes means for controlling the position of said damper.

7. The system of claim 6 in which the exhaust manifold of the engine is in two sections and the inlet fitting of the exhaust turbine is a Y type fitting having two entrance openings and a third opening for discharging the exhaust gas received from said two entrance openings into the gas inlet of said turbine, said Y type fitting being formed at its two entrance openings to mate sealably with the outlet ends of said two sections of the engine exhaust manifold, said section of exhaust line conduit interposed between said exhaust manifold and the inlet fitting of the turbine comprising a damper body formed with two parallel spaced apart end surfaces, both of said end surfaces and said body being formed with a pair of cylindrical gas passages therethrough respectively connecting said two sections of said exhaust manifold with said two entrance openings of said Y fitting, said variable cut-off damper comprising a pair of dampers each respectively secured on a pair of parallel axles journalled transversely across said two cylindrical passages of said body and means linking said axles for simultaneously similarly positioning said vanes.

8. The system of claim 6 in which said variable shut-off damper includes means rotatably supporting said damper in said interposed section of conduit and said means for controlling the position of said damper comprises motor means for operating said damper between limit positions of operation in both directions, a power source for said motor means, control means interposed between said power source and said motor means and means synchronizing said control means with the fuel control pedal of said motor to energize said motor means to rotate said damper in its direction of closing said conduit when said pedal means moves to its least fuel position and to control said motor means to rotate said damper in its direction of opening said conduit when said pedal moves away from the least fuel position.

9. The system of claim 8 in which said control means interposed between said power source and said motor means includes manual means operable as desired to render said motor means ineffective to rotate said damper in its direction of closing said conduit.

References Cited in the file of this patent

UNITED STATES PATENTS

| | | |
|---|---|---|
| 1,247,930 | Campbell | Nov. 27, 1917 |
| 1,501,363 | Noble | July 15, 1924 |
| 1,667,016 | Stokes | Apr. 24, 1928 |
| 1,890,790 | Messinger | Dec. 13, 1932 |
| 1,940,712 | Ertz | Dec. 26, 1933 |
| 2,044,316 | Messinger | June 16, 1936 |
| 2,067,975 | Messinger | Jan. 19, 1937 |
| 2,197,179 | Hersey | Apr. 16, 1940 |